(12) United States Patent
Rausch et al.

(10) Patent No.: US 9,674,807 B2
(45) Date of Patent: *Jun. 6, 2017

(54) SUBCARRIER SIGNAL FOR SYNCHRONIZATION IN MACRO NETWORK

(71) Applicant: Sprint Spectrum L.P., Overland Park, KS (US)

(72) Inventors: Walter Rausch, Shawnee, KS (US); Harry Perlow, Palm Harbor, FL (US)

(73) Assignee: Clearwire IP Holdings, LLC, Bellevue, WA (US)

( * ) Notice: Subject to any disclaimer, the term of this patent is extended or adjusted under 35 U.S.C. 154(b) by 161 days.

This patent is subject to a terminal disclaimer.

(21) Appl. No.: 14/532,349

(22) Filed: Nov. 4, 2014

(65) Prior Publication Data
US 2015/0055609 A1 Feb. 26, 2015

Related U.S. Application Data

(63) Continuation of application No. 13/872,010, filed on Apr. 26, 2013, now Pat. No. 9,198,147, which is a
(Continued)

(51) Int. Cl.
*H04W 56/00* (2009.01)
*H04H 60/91* (2008.01)
(Continued)

(52) U.S. Cl.
CPC ........ *H04W 56/0015* (2013.01); *H04H 20/34* (2013.01); *H04H 60/91* (2013.01); *H04W 56/00* (2013.01); *H04H 20/18* (2013.01)

(58) Field of Classification Search
CPC ... H04W 56/0015; H04W 56/00; H04W 4/06; H04W 88/08; H04H 60/91
(Continued)

(56) References Cited

U.S. PATENT DOCUMENTS 5,538,558 A 7/1996 Ookouchi et al.
5,549,393 A 8/1996 Morando
(Continued)

FOREIGN PATENT DOCUMENTS

DE 10236113 B3 4/2004
EP 0 610 167 A1 8/1994
(Continued)

OTHER PUBLICATIONS

Office Action mailed Aug. 30, 2012 in U.S. Appl. No. 12/814,206, filed Jun. 11, 2010, 8 pages.
(Continued)

*Primary Examiner* — Jamal Javaid

(57) ABSTRACT

Disclosed herein are methods and systems that may help a WiMAX base station function without a GPS signal by providing a high-stability reference signal via a subcarrier of a broadcast signal, such as an FM radio signal. An exemplary broadcast station may therefore be configured to phase-lock a subcarrier signal to a GPS signal, and include this subcarrier in its broadcast signal, thereby providing the subcarrier signal for use by a base station as a high-stability reference signal for local-oscillator stabilization at the base station. The broadcast station may further modulate a timing signal onto the subcarrier signal. An exemplary base station may therefore receive the broadcast signal, decode the broadcast signal to acquire the subcarrier signal, and use the subcarrier signal to stabilize its local oscillator, rather than using a GPS signal. The base station may further demodulate the subcarrier to acquire the timing signal, which the base station may use for frame-start synchronization, instead of a GPS signal.

18 Claims, 7 Drawing Sheets

Related U.S. Application Data continuation of application No. 12/814,206, filed on Jun. 11, 2010, now Pat. No. 8,451,814.

(51) Int. Cl.
*H04H 20/34* (2008.01)
*H04H 20/18* (2008.01)

(58) Field of Classification Search
USPC .................................................. 370/329, 336
See application file for complete search history.

(56) References Cited

U.S. PATENT DOCUMENTS

| | | | |
|---|---|---|---|
| 5,718,519 A | 2/1998 | Ookouchi et al. | |
| 5,954,880 A | 9/1999 | Aoki et al. | |
| 6,154,488 A * | 11/2000 | Hunt | H02J 13/0024 340/12.33 |
| 6,554,904 B1 | 4/2003 | Gimpel et al. | |
| 7,156,920 B2 | 1/2007 | Plaetzer et al. | |
| 7,175,711 B2 | 2/2007 | Platzer | |
| 8,451,814 B2 | 5/2013 | Rausch et al. | |
| 9,277,517 B2 | 3/2016 | Rausch et al. | |
| 2003/0111777 A1 | 6/2003 | Morando | |
| 2007/0189779 A1 | 8/2007 | Murphy et al. | |
| 2008/0287153 A1 | 11/2008 | Fullam | |
| 2009/0036076 A1 | 2/2009 | Weston et al. | |
| 2009/0225743 A1 | 9/2009 | Nicholls et al. | |
| 2009/0276542 A1 | 11/2009 | Aweya et al. | |
| 2009/0322603 A1 | 12/2009 | Liao | |
| 2010/0067507 A1 | 3/2010 | Park | |
| 2010/0080210 A1 * | 4/2010 | Kim | G06F 1/12 370/350 |
| 2010/0087206 A1 | 4/2010 | Touboul et al. | |
| 2010/0192849 A1 | 8/2010 | de Kock et al. | |
| 2011/0072469 A1 * | 3/2011 | Vare | H04H 60/42 725/62 |
| 2011/0081020 A1 | 4/2011 | Loomis et al. | |
| 2011/0188480 A1 | 8/2011 | Takagi | |
| 2011/0263269 A1 | 10/2011 | Do et al. | |
| 2012/0082188 A2 | 4/2012 | Nicholls et al. | |
| 2012/0188125 A1 | 7/2012 | Pomietlasz | |
| 2012/0256789 A1 | 10/2012 | Bull et al. | |
| 2012/0275554 A1 | 11/2012 | Lindqvist | |
| 2013/0324173 A1 | 12/2013 | Jarleholm et al. | |

FOREIGN PATENT DOCUMENTS

| | | |
|---|---|---|
| JP | 1159359 A | 6/1989 |
| JP | 2153055 A | 6/1990 |
| JP | 10159844 A | 6/1998 |
| WO | 2008/099819 A1 | 8/2008 |

OTHER PUBLICATIONS

Rosum Corporation, Rosum FemtoSynch In-Building Timing and Location for Femtocells, dated Oct. 2008, 16 pages.

Office Action mailed Jan. 22, 2013 in U.S. Appl. No. 13/060,691, filed Feb. 25, 2011, 6 pages.

Office Action mailed Sep. 9, 2014 in U.S. Appl. No. 13/872,010, filed Apr. 26, 2013, 16 pages.

* cited by examiner

SUBCARRIER SIGNAL FOR SYNCHRONIZATION IN MACRO NETWORK

RELATED APPLICATIONS

This application is a continuation of co-pending U.S. patent application Ser. No. 13/872,010, filed on Apr. 26, 2013, which is a continuation of U.S. patent application Ser. No. 12/814,206, filed on Jun. 11, 2010, both of which are incorporated herein by reference herein for all purposes.

BACKGROUND

The recent introduction of WiMAX technology promises to further increase the proliferation of wirelessly-equipped devices. WiMAX (Worldwide Interoperability for Microwave Access) is an Institute of Electrical and Electronics Engineers (IEEE) standard, designated 802.16, with the 802.16e being the current version of the standard (the terms "IEEE 802.16," "IEEE 802.16e," and "WiMAX" may be used interchangeably herein). WiMAX provides a robust mechanism for wireless communication between base stations and subscriber stations. In particular, WiMAX is designed to provide fixed, portable or non-line-of-sight service with a potential range of five miles, a throughput on the order of thirty megabits per second, and superior quality of service and security.

WiMAX chipsets that provide for communication in accordance with the WiMAX protocol are becoming increasingly prevalent as standard or optional equipment not only in traditional wireless communications devices, such as cellular phones and personal digital assistants, but also in devices that, heretofore, were not used for access to telephony networks. These devices include portable music players, entertainment devices such as game players, automobiles, domestic appliances and so on.

WiMAX networks are typically implemented as a macro cellular wireless networks (i.e. wireless wide area networks (WWANs)), which typically provide communication services such as voice, text messaging, and packet-data communication for WiMAX-capable mobile stations. Such mobile stations (which may also be referred to as access terminals, subscriber stations, or client devices, among other terms) and networks typically communicate with each other over a radio frequency (RF) air interface according to one or more wireless protocols (e.g. WiMAX, CDMA (Code Division Multiple Access), EV-DO (Evolution Data Optimized), and/or one or more others). Mobile stations typically conduct wireless communications with these networks via one or more base transceiver stations (BTSs), each of which send communications to and receive communications from mobile stations over the air interface.

Each BTS is in turn connected with a network entity known as a base station controller (BSC) (which may also be referred to as a radio network controller (RNC)), which controls one or more BTSs and acts as a conduit between the one or more BTSs and one or more switches or gateways, such as a mobile switching center (MSC) and/or a packet data serving node (PDSN). The one or more switches or gateways may then interface with one or more signaling and/or transport networks. As examples, an MSC may interface with the public switched telephone network (PSTN), while a PDSN may interface with one or more core packet data networks and/or the Internet. As such, mobile stations can typically communicate over the one or more signaling and/or transport networks from anywhere inside the coverage area of one or more BTSs, via the BTS(s), a BSC, and a switch or gateway such as an MSC and/or PDSN.

In WiMAX, data communications between a mobile station and a base station (i.e. a BTS, or combinations of one or more BTSs and a BSC) are formatted as Orthogonal Frequency-Division Multiplexed (OFDM) symbols, which are further organized into data frames. As some WiMAX systems employ Transmit Division Duplexing, all base stations in a given market typically begin their transmissions at the same. In particular, the base stations in a given coverage area all begin transmitting each frame at substantially the same time, a concept which is referred to herein as "frame-start synchronization." As there is a five millisecond (ms) frame interval (i.e., each frame has a duration of five ms), this means that the transmitters of each base station turn off and on twenty times per second.

OVERVIEW

In order to synchronize transmissions, nearby WiMAX base stations each need a highly-accurate and stable reference signal that can be used to stabilize the base station's transmitter. In addition, the nearby base stations need access to a timing signal from a common source so that the transmission of frames can be synchronized. Existing WiMAX base stations typically include a highly-stable local oscillator, which stabilizes the base station's transmitter. The local oscillator is typically stabilized using a GPS signal. This local oscillator is typically a rubidium oscillator, although any type of oscillator providing the required accuracy may be employed. Compliance with FCC requirements requires that the local oscillator provide a high degree of signal stability for transmissions. Specifically, to meet the FCC requirements for stability, a WiMAX base station must generate a radio frequency (RF) signal with a degree of precision around 50 parts-per-billion (ppb). Maintaining this accuracy over time can be a challenge, as local oscillators tend to drift due to factors such as temperature fluctuation.

In practice, current WiMAX base stations typically use a Global Positioning System (GPS) signal to calibrate the local oscillator in compliance with the FCC requirements. In particular, a GPS signal typically includes a highly-accurate 10 MHz frequency pulse. As such, the local oscillator at a base station can be phase-locked to the GPS signal and used to stabilize the base-station transmitter. Furthermore, the 10 MHz frequency pulse may serve as a timing signal, which can be used by nearby base stations to synchronize the transmission of data frames (i.e., for frame-start synchronization).

Existing WiMAX base stations may also use a GPS signal for a number of other purposes. More specifically, in addition to using GPS (1) to stabilize a local oscillator and (2) for frame-start synchronization, base stations typically (3) acquire time-of-day information from a GPS signal, which helps the base station to accurately report events to a service provider's network operations center, and (4) use the GPS signal to determine geographic location. However, relying on a GPS signal can present a problem for a base station, as acquiring a GPS signal typically requires a line-of-sight view of a GPS satellite, which is not available in many locations. Accordingly, exemplary methods and systems are provided herein that help a WiMAX base station operate without requiring a GPS signal for some, or preferably all, of the functions for which a GPS signal is currently used.

In one aspect, an exemplary method may be carried out at a broadcast station, and may involve: (a) at a broadcast station, receiving a GPS signal; (b) the broadcast station using the GPS signal to generate a subcarrier signal, wherein the subcarrier signal is phase-locked to the GPS signal; and (c) the broadcast station transmitting the subcarrier signal, thereby providing the subcarrier signal for use by a base station as a high-stability reference signal for local-oscillator stabilization at the base station.

The method may further involve: (d) the broadcast station generating a timing signal comprising timing information, wherein the timing signal is phase-locked to the GPS signal; and (e) before transmitting the subcarrier signal, the broadcast station modulating the timing signal onto the subcarrier, thereby providing the timing information for use by a base station for frame-start synchronization. Furthermore, the broadcast station may periodically interrupt the timing information in the timing signal, wait a predetermined period of time, and then insert time-of-day information in the timing signal.

In a further aspect, another exemplary method may be carried out at a base station, and may involve: (a) at a base station, receiving a broadcast signal from a broadcast station, wherein the signal comprises a subcarrier signal, and wherein the broadcast station has phase-locked the subcarrier signal to a GPS signal; (b) decoding the broadcast signal to acquire the subcarrier signal; and (c) using the subcarrier signal to stabilize a local oscillator at the base station, wherein the local oscillator is used by the base station to maintain signal stability for WiMAX communications. The method may further involve (d) demodulating the subcarrier signal to acquire the timing signal and (e) the base station using the timing information provided by the timing signal as a basis for frame-start synchronization.

In yet a further aspect, an exemplary system may take the form of a broadcast station or components thereof, and may include (a) a GPS receiver configured to acquire a GPS signal; (b) a local oscillator that is phase-locked to the GPS signal; (c) a subcarrier generator that is configured to generate a subcarrier signal, wherein the subcarrier signal is phase-locked to the GPS by the local oscillator; and (d) a transmitter configured to transmit a broadcast signal that includes the subcarrier signal, thereby providing the subcarrier signal for use by a base station as a high-stability reference signal for local-oscillator stabilization at the base station. The system may further include (e) a timing-signal generator that is configured to generate a timing signal comprising timing information, wherein the timing signal is phase-locked to the GPS signal. As such, the subcarrier generator may be configured, before transmitting the broadcast signal that includes the subcarrier signal, to modulate the timing signal onto the subcarrier signal, thereby providing the timing information for use by a base station for frame-start synchronization.

And in yet a further aspect, another exemplary system may take the form of a base station in a macro network or components thereof, and may include: (a) a receiver configured to receive a broadcast signal at a base station, wherein the broadcast signal comprises a subcarrier signal, and wherein a broadcast station has phase-locked the subcarrier signal to a GPS signal; (b) a decoder configured to decode the broadcast signal to acquire the subcarrier signal; and (c) means for using the subcarrier signal to stabilize a local oscillator at the base station, wherein the local oscillator is used by the base station to maintain signal stability for WiMAX communications. The system may further include: (e) a demodulator that is configured to demodulate the subcarrier to acquire the timing signal; and (f) means for using the timing information provided by the timing signal as a basis for frame-start synchronization at the WiMAX base station.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION

In general, the invention may be described by way of example, with reference to Worldwide Interoperability for Microwave Access (WiMAX) systems. However, it is anticipated that exemplary embodiments may be implemented in any macro network, including macro networks operating under telecommunications protocols other than WiMAX. For example, exemplary methods and systems may also be employed in the context of Long Term Evolution (LTE) systems such as those currently standardized by the $3^{rd}$ Generation Partnership Project (3GPP), and those in development (e.g., LTE Advanced) or yet to be developed. Accordingly, descriptions of exemplary embodiments relating to WiMAX systems should not be construed as limiting their applicability thereto.

Figure 1:
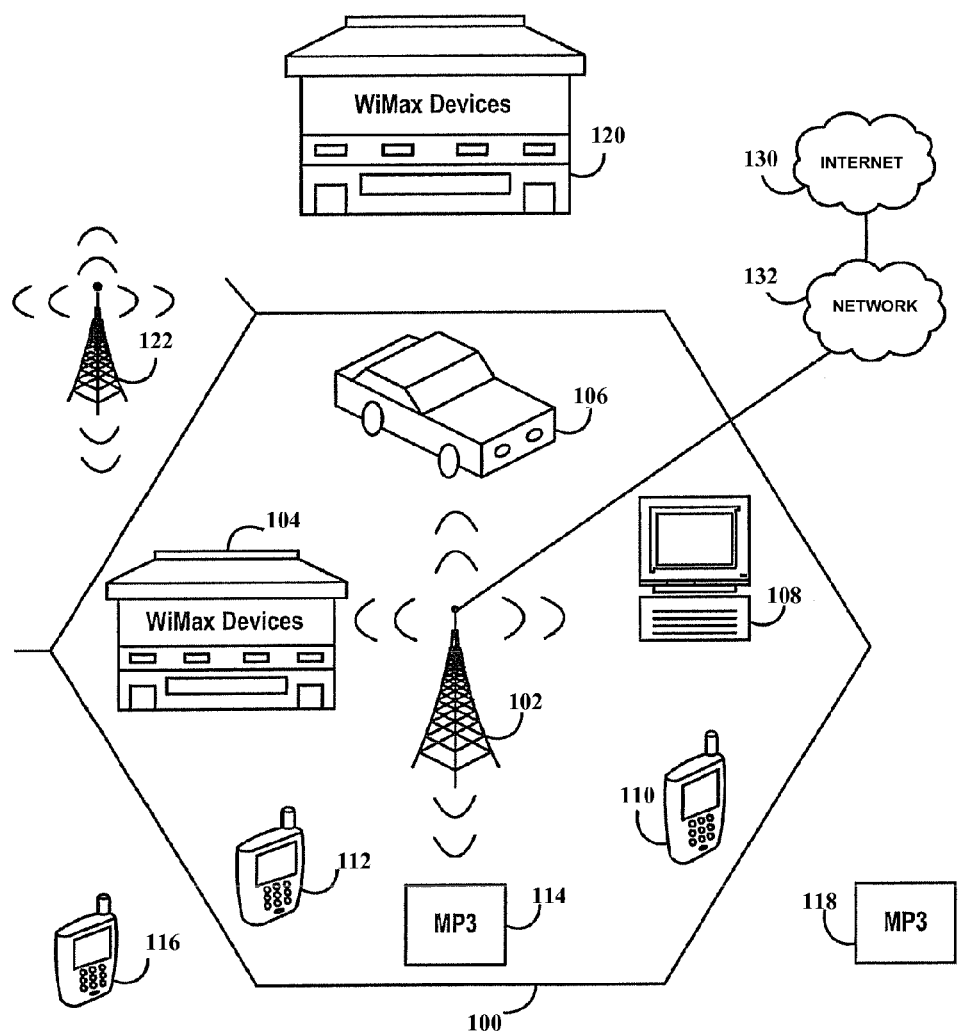
FIG. 1 is schematic representation of a coverage area where service is available from a WiMAX base station.

FIG. 1 is schematic representation of a coverage area 100 where service is available from a WiMAX base station 102. Also shown are a plurality of WiMAX client devices that may compete for ranging resources of the WiMAX base station 102. The client devices may take the form of, for example, WiMAX devices located in a building or home 104, such as computer, appliance or cell phone, WiMAX devices located in an automobile 106, a portable computer 108, a cellular telephone 110, a personal digital assistant 112, an MP3 player 114, another cell phone 116, another MP3 player 118 and/or various WiMAX devices located within an office building 120 such as computers, cell phones, game players, etc. Adjacent areas may be covered by other base stations, one of which is shown as base station 122.

Provided with a WiMAX connection via base station 102, a client device may engage in various types of communication. For instance, a base station 102 may provide connectivity to a packet-switched network 130 such as the Internet. Further, packet-data connectivity may be provided via a service provider's network 132 or directly. In addition to packet-data connectivity, a WiMAX connection may also provide access to other services such as voice-over-IP (VOIP), among others.

It should be understood that references to a WiMAX base station, such as base station 102, are representative of various types of entities, and generally apply to any entity configured to provide WiMAX service. Such entities may include, but are not limited to, commercial base stations that are installed by service providers, as well as base stations that a subscriber (such as a private consumer or small business) may install in their home or place of business. For example, to address gaps in macro-network coverage (e.g. in buildings) and for other reasons, macro-network service providers may offer consumers devices referred to as femtocells, which may also be referred to as femto base stations, femto BTSs, picocells, pico base stations, pico BTSs, microcells, micro base stations, micro BTSs, and by other names, such as Internet base stations or perhaps low-cost Internet base stations (LCIBs). With respect to the term LCIB, low-cost is not used as a limiting term; that is, devices of any monetary cost may be categorized as LCIBs, though most LCIBs typically will be less expensive on average than most macro-network base stations.

A femtocell may be approximately the size of a desktop phone or WiFi access point, and is essentially a low-power, low-capacity version of a macro base station. Thus, a femtocell may use a power outlet, perhaps with a transformer providing a DC power supply. The femtocell may have a wired (e.g. Ethernet) or wireless (e.g. WiFi) connection with the user's router, and would thus have connectivity to the Internet and/or one or more other packet-data networks via that broadband connection. A femtocell may establish a virtual-private-network (VPN) connection over the Internet with an entity (e.g. a VPN terminator) on the wireless-service (macro-network) provider's core network, and thereby be able to securely communicate via the VPN terminator with other entities on that core network and beyond. A typical femtocell also has a wireless-communication interface (operating according to WiMAX, CDMA, EV-DO, and/or one or more other protocols) that is compatible with the user's mobile station(s), such that the femtocell may act as a micro base station, providing coverage for the mobile station(s) on the macro-network provider's network via the user's Internet connection. Usually, a femtocell provides service on a single RF carrier (or on a single carrier per protocol, if multiple protocols (e.g. WiMAX and EV-DO) are supported).

Figure 2:
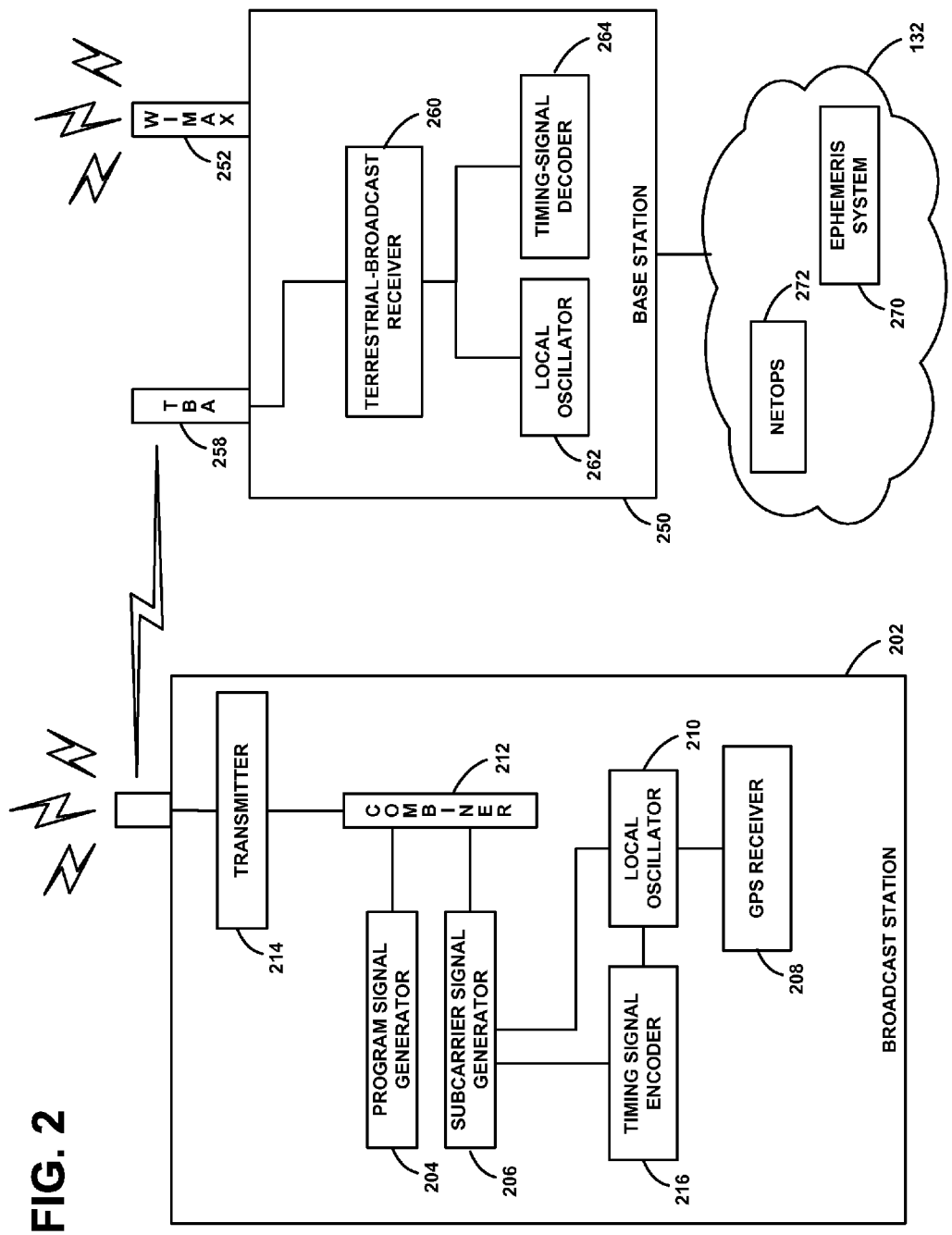
FIG. 2 is a block diagram illustrating a communication system, according to an exemplary embodiment.

FIG. 2 is a block diagram illustrating a communication system, according to an exemplary embodiment. In one aspect, the communication system includes a broadcast station 202, which may be any entity configured for terrestrial broadcast services, such as an FM radio station for instance. In an exemplary embodiment, the broadcast station 202 may radiate a broadcast signal, which includes a subcarrier that is phase-locked to a GPS signal and thus serves as a high-stability reference signal for a WiMAX base station 250. Further, the broadcast station 202 may modulate timing information for frame-start synchronization, and/or TOD information, onto the subcarrier. Yet further, WiMAX base station 250 may be pre-programmed with its location or configured to determine its location using non-GPS means (such as a local Internet connection, for instance). With this arrangement, WiMAX base station 250 may be fully operational without any use of GPS, as all functions for which a GPS signal would otherwise be used (e.g., local-oscillator stabilization, frame-start synchronization, obtaining TOD information, and/or location determination), may be accomplished using the subcarrier and/or non-GPS location information.

However, while it is preferable that WiMAX base station 250 be fully operational without relying on a GPS signal, it should be understood that in some embodiments, WiMAX base station 250 may use the subcarrier to replace GPS for some purposes, but still use GPS for other purposes. Moreover, it is even possible that the subcarrier be used alongside or in conjunction with GPS, with the subcarrier and GPS providing some or all of the same functionality.

Referring now to the broadcast station 202, it includes a program signal generator 204, which may be configured to modulate program information onto a baseband carrier, and a subcarrier signal generator 206, which is configured to generate a subcarrier signal. The broadcast station 202 also includes a GPS receiver 208 and a high-stability local oscillator 210, which may both be used, along with the subcarrier signal generator 206, to provide high-stability subcarrier that is phase-locked to a GPS reference signal. Combiner 212 may function to combine the program information from program signal generator 204 and the subcarrier signal from subcarrier signal generator 206 for broadcast by transmitter 214. Configured as such, the subcarrier may be used by base station 250 as a high-stability reference signal for stabilizing the base station's local oscillator.

In a further aspect, broadcast station 202 includes a timing signal encoder 216. The timing signal encoder 216 is also stabilized by the high-stability oscillator 210, and thus phase-locked to the GPS timing signal acquired by GPS receiver 208. Preferably, the timing signal encoder 216 generates a frequency shift keying (FSK) timing signal, which is then modulated onto the subcarrier generated by subcarrier signal generator 206. For instance, the FSK timing signal may be a binary FSK signal having transitions that occur at the same rate as WiMAX frames (i.e., the period between transitions is 5 ms—the same duration as a WiMAX frame). In so doing, the subcarrier provides a reference timing signal, from which base station 250 can derive timing information for frame-start synchronization. Therefore, base station 250 may rely on the timing information modulated onto the subcarrier for frame-start synchronization, instead of a GPS timing signal received at the base station.

In yet a further aspect, timing signal encoder 216 may be configured to embed time-of-day (TOD) information in the timing signal. For instance, in an exemplary embodiment, timing signal encoder 216 may periodically interrupt the timing signal by ceasing to encode timing information in the timing signal, or ceasing output of the timing signal altogether, for a predetermined period of time. After this predetermined period, the timing signal encoder 216 may output TOD information (which may be acquired from the GPS timing signal output from GPS receiver 208), and then resume outputting the timing signal. As this transition and TOD information is broadcast in the subcarrier, the subcarrier may thus provide base station 250 with TOD information, which it would otherwise acquire directly from a GPS timing signal.

In a further aspect, timing signal encoder 216 may also embed location data (e.g., GPS coordinates), which indicates the location of the broadcast station 202, in the timing signal. This location data may allow a base station receiving the timing signal to calculate the distance between the base station and the broadcast station 202, in order to account for time-of-flight delay.

Referring now to base station 250, it may be any type of WiMAX base station. As shown, base station 250 includes a WiMAX antenna 252 that it may use to provide service to WiMAX devices operating in its coverage area. In an exemplary embodiment, base station 250 is configured to use the subcarrier signal that is broadcast by broadcast station 202 as a reference signal, with which base station 250 stabilizes its local oscillator. Further, base station 250 may be configured to use the timing signal, which is modulated onto the subcarrier by broadcast station 202, for frame-start synchronization. As such, base station 250 includes a terrestrial broadcast antenna (TBA) 258 and a broadcast receiver 260 for receiving the broadcast signal from broadcast station 202.

Configured as such, base station 250 may use the subcarrier signal to support at least some, and preferably all, of the functionality for which GPS would otherwise be used. More specifically, broadcast receiver 260 may include a subchannel decoder that operates to extract the subcarrier from the received broadcast signal. As the subcarrier has been phase-locked to the GPS timing signal by the broadcast station 202, it provides a highly-accurate reference signal, which base station 250 may then use to stabilize its own local oscillator 262. In particular, base station 250 may phase-lock the frequency of local oscillator 262 to the subcarrier. By doing so, base station 250 may stabilize is local oscillator 262 without access to a GPS satellite.

Furthermore, base station 250 may include a timing signal decoder 264 that is configured to demodulate the subcarrier signal in order to obtain the timing signal that was modulated onto the subcarrier at broadcast station 202. In an exemplary embodiment, the timing signal is an FSK timing signal. As such, base station 250 may achieve frame-start synchronization by transmitting WiMAX frames such that the timing of frames corresponds to the transitions of the FSK timing signal. In particular, to transmit each frame, the base station 250 may apply a time advance from each transition, which accounts for the time-of-flight delay between broadcast station 202 and base station 250, and then transmit the frame. Furthermore, nearby base stations may likewise be configured to apply time advances, which are based on their respective time-of-flight delays to broadcast station 202. Therefore, by applying their respective time advances to the FSK timing signal, base station 250 and the nearby base stations can effectively synchronize the transmission of each frame.

Preferably, the time advance (which may also be referred to as a timing offset) that base station 250 applies for frame-start synchronization is provided by an ephemeris system 270 that is part of, or accessible through, service provider network 132. In particular, base station 250 may send its own geographic coordinates, along with the broadcast frequency of the broadcast station 202, to ephemeris system 270. Ephemeris system 270 may then be configured to access a database (not shown), which identifies broadcast stations by their broadcast frequency, and provides each station's geographical coordinates. As such, the ephemeris system 270 may query this database with the broadcast station frequency reported by base station 250 to determine the location of broadcast station 202. The ephemeris system 270 may then use the location of broadcast station 202 and the location of base station 250 to calculate the time-of-flight delay, and corresponding time advance that should be used by base station 250. The ephemeris system 250 may then send this time advance to base station 250.

Alternatively, base station 250 may itself determine the time advance. To do so, base station 250 may use various techniques to determine the time-of-flight delay from broadcast station 202, which base station 250 may then apply as a time advance for frame-start synchronization. In such embodiments, base station 250 typically calculates the distance between base station 250 and broadcast station 202 (which may involve the base station determining the location of the broadcast station 202 and its own location), and uses this distance to determine the time-of-flight delay to the broadcast station 202. In particular, the time-of-flight delay may be set equal to the product of the distance to the broadcast station 202 multiplied by a known constant speed at which the broadcast signal travels.

To determine its own location (either to send to ephemeris engine 270, or to use to itself determine the time advance), base station 250 may use various techniques. For instance, the base station's own location may be pre-programmed into base station 250. In particular, a service provider, knowing the location of the installation, may input the latitude and longitude of the base station 250 during installation. Alternatively, a base station 250 may derive its own location via an Internet connection, and in particular may determine its physical location via a database lookup from the internet service provider's MAC Address/location subscriber database in which the base station's location is typically recorded during the registration process.

Further, in embodiments where base station 250 itself determines the time advance, the base station may use various techniques to determine the location of the broadcast station 202. For example, base station 250 may be provided with access to a database of broadcast stations identified by their RF frequencies, and their corresponding geographical coordinates. As such, the base station 250 may query this database to determine the location of a broadcast station 202 from which the timing signal is received. Alternatively, the timing signal itself may include location data indicating the location of broadcast station 202, which base station 250 may extract along with the timing information. Generally, it should be understood that any technique for determining distance to the broadcast station and/or the corresponding time advance (e.g., the time-of-flight delay) may be employed, without departing from the scope of the invention.

In another aspect, base station 250 may extract the time-of-day information embedded in the received timing signal. To do so, the base station 250 may detect an interruption in the timing information, then look for the time-of-day information. The base station 250 may then use the extracted time-of-day information to send a timestamped report to Network Operation Center (NETOPS) 272, which is maintained by the service provider.

Figure 3A:
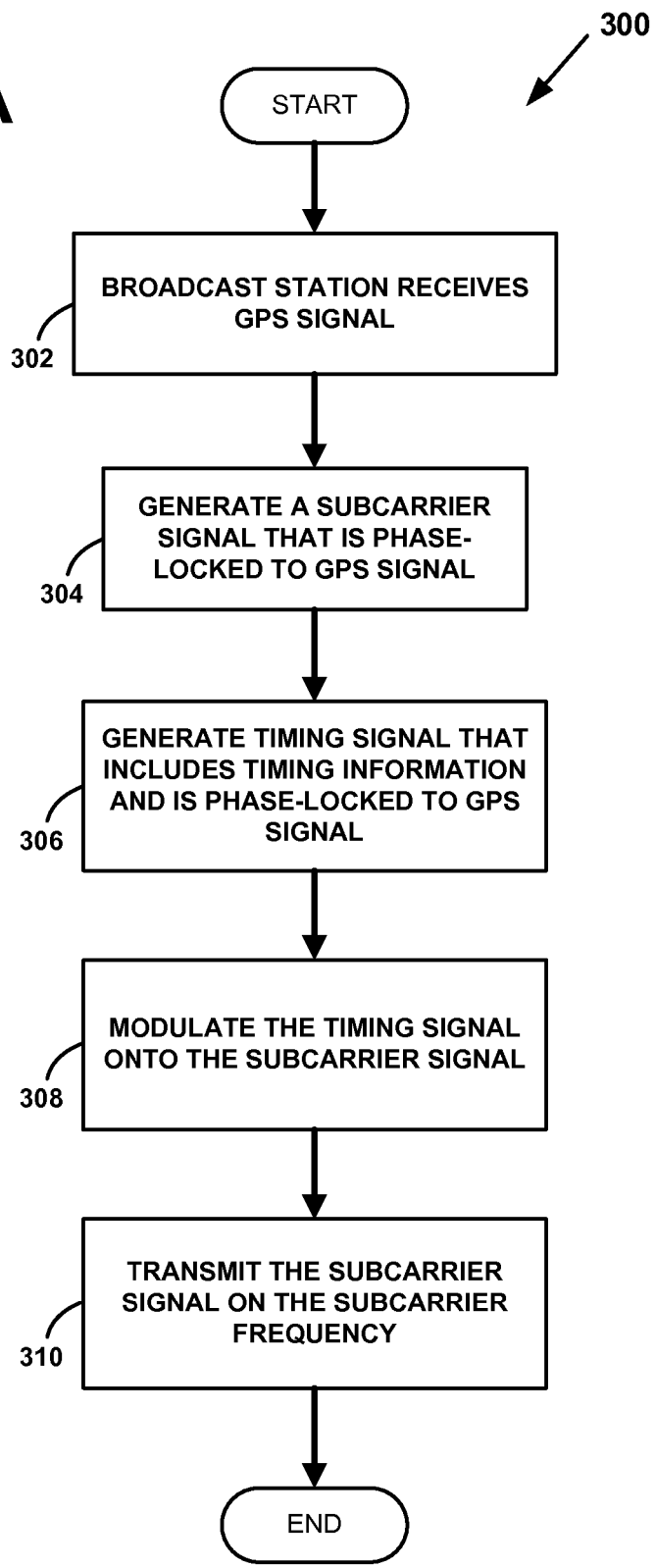
FIG. 3A is a flow chart illustrating a method, according to an exemplary embodiment.

FIG. 3A is a flow chart illustrating a method 300 according to an exemplary embodiment. The method is described by way of example as being carried out by a broadcast station. It should be understood that functions that are described as being carried out by a broadcast station may be carried out by any entity implemented by or provided to a broadcast station. Such entities include, but are not limited to, entities related to generating and broadcasting a terrestrial broadcast signal, and other entities communicatively coupled to such entities.

Method 300 involves the broadcast station receiving a GPS signal, as shown by block 302. The broadcast station then generates a subcarrier signal that is phase-locked to the GPS signal, and thus serves as a high-stability reference for a WiMAX base station, as shown by block 304. In addition, the broadcast station generates a timing signal that is also phase-locked to the GPS signal, and includes timing information, as shown by block 306. The base station then modulates the timing signal onto the subcarrier signal, as shown by block 308. The broadcast station then transmits the subcarrier signal on the subcarrier frequency, as shown by block 310. By so doing, the broadcast station provides the subcarrier for use by a WiMAX base station, which may decode the subcarrier signal and use it as high-stability reference signal to stabilize its local oscillator. Further, the WiMAX base station may demodulate the subcarrier to extract the timing signal and timing information contained therein. The timing information can then be used by the WiMAX base station for frame-start synchronization.

Figure 3B:
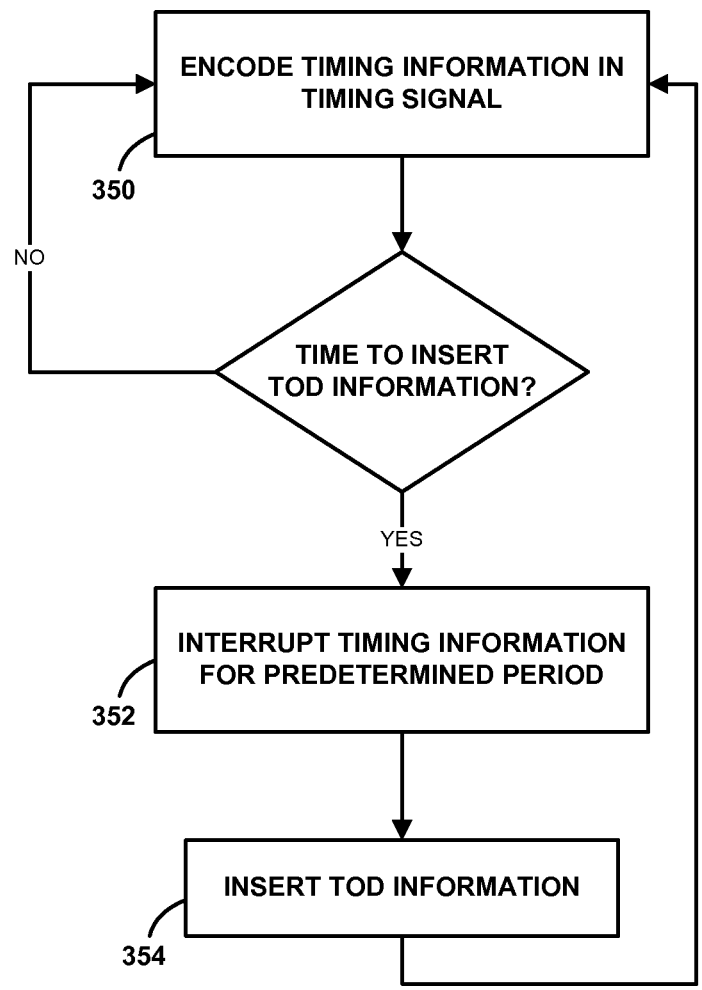
FIG. 3B is another flow chart illustrating a method, according to an exemplary embodiment.

FIG. 3B is a flow chart illustrating an additional aspect of an exemplary method, in which the broadcast station includes time-of-day (TOD) information in the timing signal that is modulated onto the subcarrier. In particular, the broadcast station may continually encode timing information in the timing signal it outputs, as shown by block 350. For instance, the broadcast station may encode timing information in the timing signal using frequency shift keying (FSK). Then, to provide TOD information, the broadcast station periodically interrupts (i.e., stops encoding) the timing information for a predetermined period of time, as shown by block 352. This interruption indicates that TOD information will follow. Accordingly, after interrupting the timing information and waiting for the predetermined period of time, the broadcast station inserts TOD information in the timing signal (e.g., encodes the TOD information in the timing signal), as shown by block 354. After inserting the TOD information, the broadcast station resumes encoding timing information in the timing signal, as shown by block 350. Accordingly, the broadcast station may repeatedly perform this method to periodically provide TOD information via the timing signal.

Figure 4:
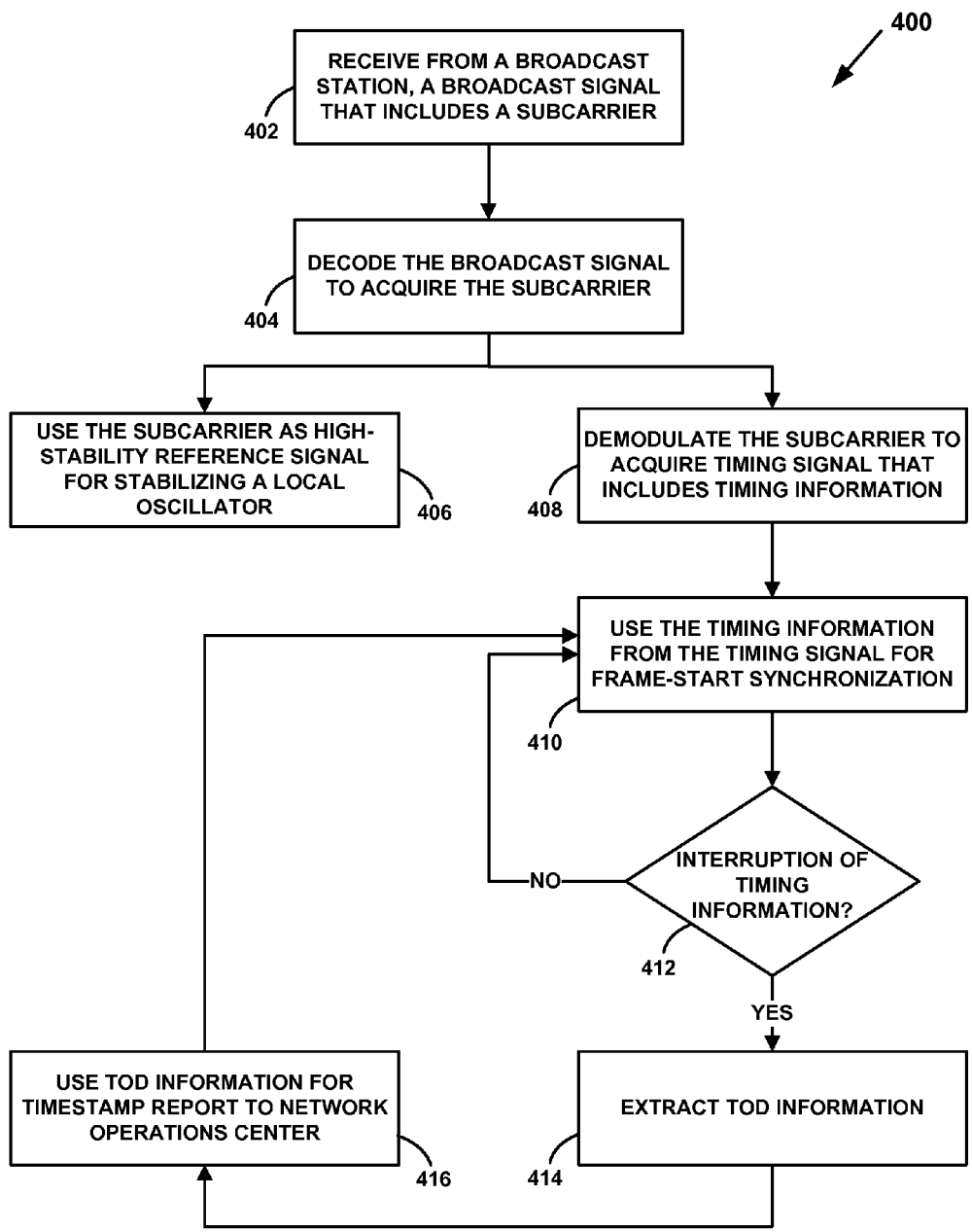
FIG. 4 is another flow chart illustrating a method, according to an exemplary embodiment.

FIG. 4 is another flow chart illustrating a method 400 according to an exemplary embodiment. The method is described by way of example as being carried out by a WiMAX base station. It should be understood that functions that are described by way of example as being carried out by a WiMAX base station, but may be carried out by any entity or entities that are configured to provide the described functionality, without departing from the scope of the invention.

As shown, method 400 involves the base station receiving from a broadcast station, a broadcast signal that includes a subcarrier, as shown by block 402. The base station then decodes the broadcast signal to acquire the subcarrier, as shown by block 404. The base station then uses the subcarrier as a high-stability reference signal for stabilizing the BS's local oscillator, as shown by block 406. The subcarrier signal has been phase-locked to a GPS signal at the broadcast station, before being broadcast. Therefore, the base station can stabilize its local oscillator using the subcarrier, which alleviates the need for the base station to itself use a GPS signal for stabilization of its local oscillator.

In a further aspect of method 400, the base station may extract timing information from the subcarrier, which the base station may then use to synchronize the transmission of WiMAX frames with other nearby BSs. More specifically, the broadcast station may have modulated a timing signal onto the subcarrier, the therefore the base station may demodulate the subcarrier to acquire the timing signal, as shown by block 408. The base station may then use the timing information from the timing signal for frame-start synchronization, as shown by block 410. For example, the timing signal is preferably an FSK timing signal. As such, the base station may detect when transitions in the FSK timing signal occur. The base station may also determine a time-of-flight delay between itself and the broadcast station. Then, to implement frame-start synchronization with nearby BSs, the base station may detect each transition and then delay for a period of time to compensate for the time-of-flight delay before transmitting a next WiMAX frame.

In yet a further aspect of method 400, the base station may periodically acquire TOD information from the timing signal. In particular, as shown by block 412, the base station may periodically detect in the timing signal, an interruption in the timing information being provided via the timing signal, which indicates that TOD information will follow. Accordingly, the base station may then look for TOD information in the timing signal, rather than timing information, and extract the TOD information from the timing signal, as shown by block 414. The base station may then use the TOD information to send a report, which includes a timestamp, to the WiMAX Network Operations Center, as shown by block 416.

Further, it should be understood that when the base station detects an interruption in the timing information, the base station may continue processes for frame-start synchronization, using the last-received timing information. Then, once the TOD information has been extracted from the timing signal, the base station may resume looking for and using timing information from the timing signal for frame-start synchronization, as shown by block 410.

Figure 5A:
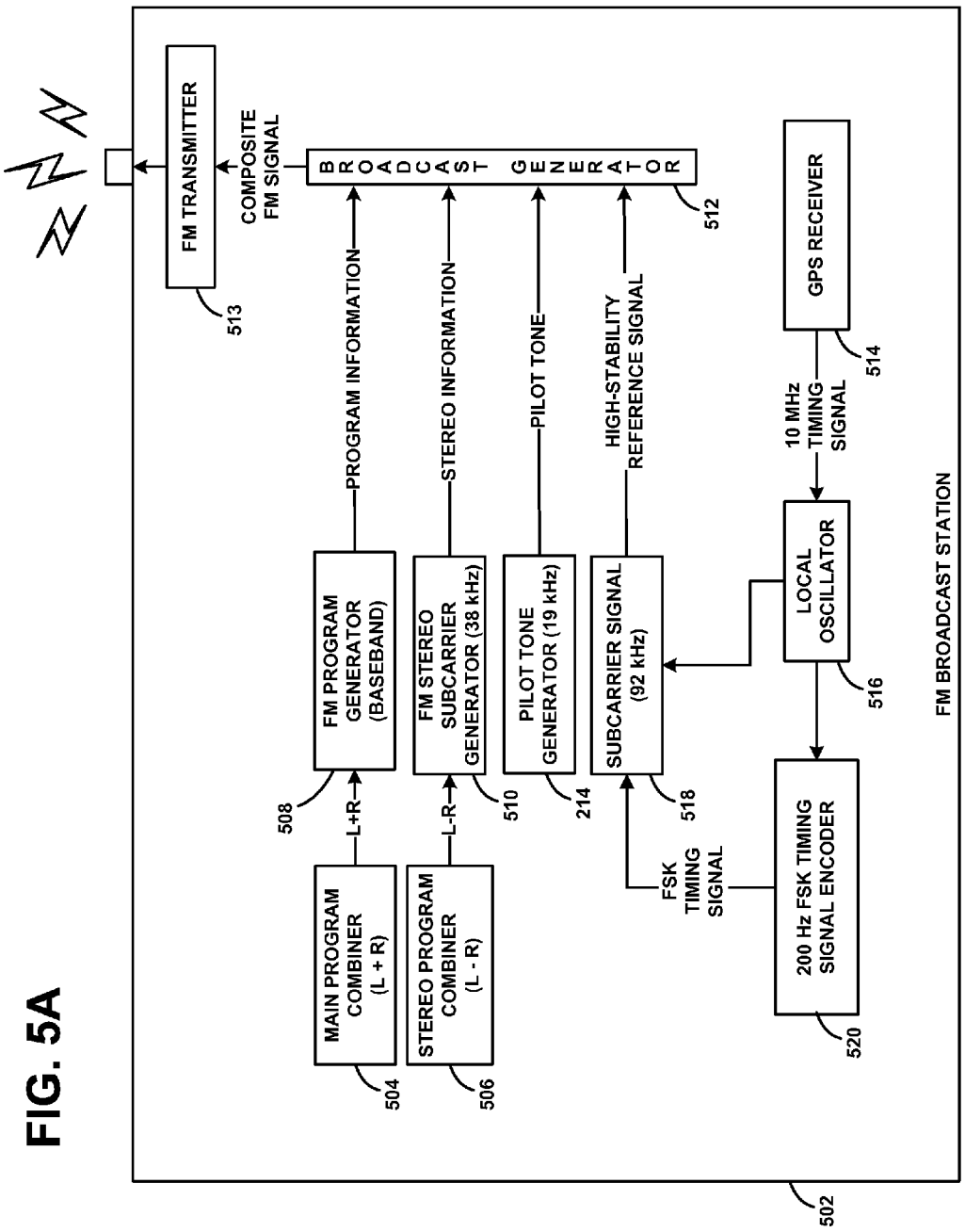
FIG. 5A is a block diagram illustrating an FM radio station, according to an exemplary embodiment.
Figure 5B:
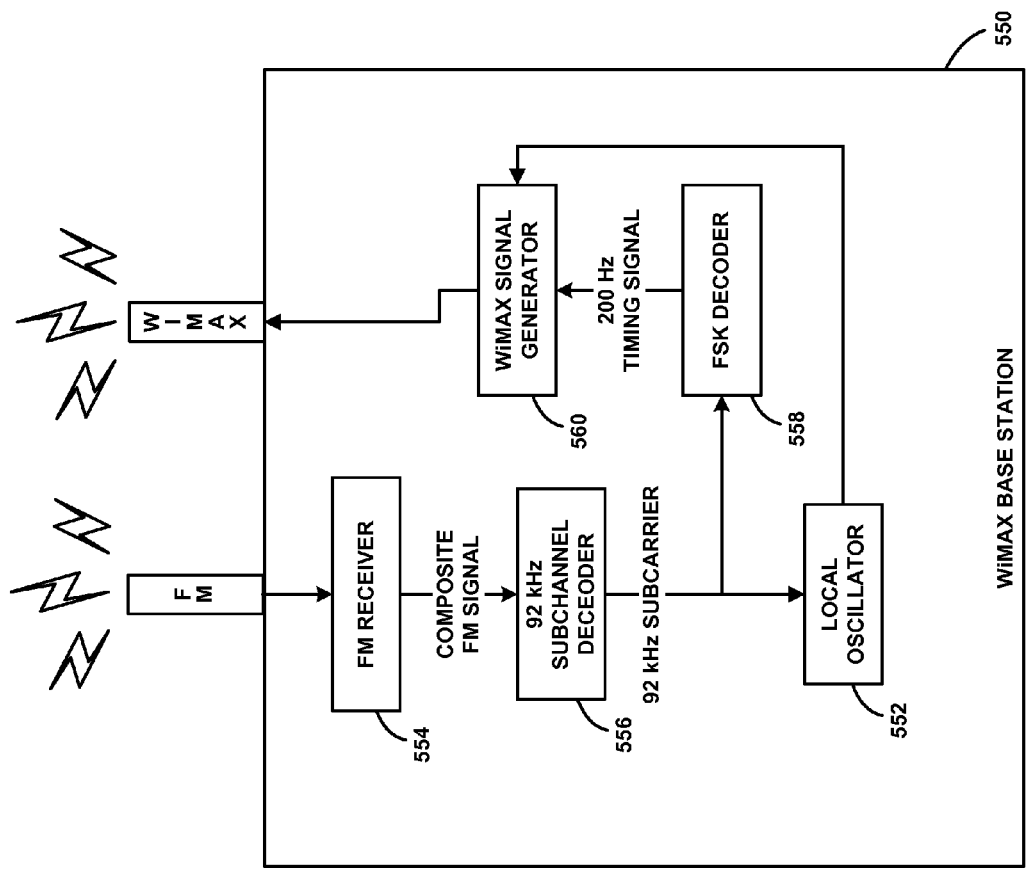
FIG. 5B is a block diagram illustrating a WiMAX base station, according to an exemplary embodiment.

FIGS. 5A and 5B are block diagram illustrating components of a communications system in which a subcarrier of an FM radio signal is used as a high-stability reference signal for local-oscillator stabilization at a WiMAX base station. In particular, FIG. 5A is a block diagram illustrating an exemplary FM radio station 502, which transmits a terrestrial broadcast signal that includes a 92 kHz subcarrier that is phase-locked to a GPS timing signal. FIG. 5B shows an exemplary WiMAX base station 550 that is configured to use the terrestrial broadcast signal as a high-stability reference signal, rather than using a GPS signal for this purpose.

As shown, the FM broadcast station 502 (also referred to herein as an "FM station") includes standard features for broadcasting an FM radio signal. Specifically, FM station 502 includes a main program combiner 504 and a stereo program combiner 506. Commercial FM broadcast stations normally transmit two channels of audio: Left (L) and Right (R). To do so requires a baseband signal and a subcarrier. When an FM signal is weak, however, only one signal can be recovered. As such, the main program combiner 504 creates the left and right audio in a single signal (L+R), which FM program information generator 508 then modulates onto a baseband frequency between 30 Hz and 15 kHz. The stereo program combiner then outputs a signal that is the right channel subtracted from the left channel (L-R), which FM Stereo Subcarrier generator 510 then modulates onto a 38 kHz subcarrier. Therefore, a receiver can recover the left and right channels by adding the baseband signal and the subcarrier (for the left channel) and subtracting the subcarrier from the baseband signal (for the right channel). And, if the signal is weak, and only the baseband signal is available, the receiver will not be able to recover stereo, but still receives all the audio information (i.e., L+R).

FM broadcast station 502 also includes a pilot tone generator, which generates a 19 kHz pilot tone. A receiving station can then detect the FM broadcast by listening for the 19 kHz pilot tone. A broadcast generator 512 then combines the baseband signal, the 19 kHz pilot tone, the 38 kHz subcarrier, and any other subcarriers to produce a composite FM signal, which modulates FM transmitter 513. Techniques such as the foregoing for FM broadcasting are well known in the art, and thus not described in greater detail herein.

The FM broadcast station 502 is also configured to include a 92 kHz subcarrier in the composite signal, which serves as a high-stability reference signal for WiMAX base stations. Accordingly, FM station 502 may include a GPS receiver 514 and a local oscillator 516, which may be used, along with a 92 kHz subcarrier generator 518, to provide a 92 kHz subcarrier which is highly stable and phase-locked to a GPS timing signal.

At FM broadcast station 502, GPS receiver 514 may function to provide a GPS coordinates (e.g., latitude and longitude), time-of-day (TOD) information, and/or a GPS timing signal, which typically takes the form of a 10 MHz frequency pulse. The GPS timing signal may be fed to the local oscillator 516, which is then phase-locked to the GPS timing signal. As such, 92 kHz subcarrier generator 518 may use local oscillator 516 to generate the 92 kHz subcarrier, thus substantially synchronizing the phase of the 92 kHz subcarrier with the phase of the GPS timing signal. As a result, the 92 kHz subcarrier provides a high-stability reference signal for WiMAX base stations.

In a further aspect, to provide WiMAX base stations with timing information for frame-start synchronization, FM broadcast station 502 also includes an FSK timing signal encoder 520 (also referred to herein as an "FSK encoder"). FSK encoder 520 is preferably configured to generate a 200 Hz FSK timing signal, which is preferably a binary FSK signal having transitions that occur at the same rate as WiMAX frames. As such, FSK timing signal may provide timing information that a WiMAX base station can use to achieve frame-start synchronization with nearby base stations. The FSK encoder 520 is also stabilized by the local oscillator 516, and thus phase-locked to the GPS timing signal provided by GPS receiver 514.

FSK encoder 520 may also be configured to output the 200 Hz FSK timing signal to the 92 kHz subcarrier generator 518. The subcarrier generator 518 can then modulate the 200 Hz FSK timing signal onto the 92 kHz subcarrier (or alternatively, the FSK timing signal encoder 520 may itself modulate the 200 Hz FSK timing signal onto the 92 kHz subcarrier). The broadcast generator 512 may then include the 92 kHZ subcarrier (with the 200 Hz FSK timing signal modulated thereon), along with the baseband signal, the 19 kHz pilot tone, and the 38 kHz subcarrier, in the composite FM signal.

In a further aspect, to provide WiMAX base stations with the TOD information they would otherwise obtain from their own GPS receivers, FSK timing signal encoder 520 may be configured to embed the time-of-day (TOD) information from GPS receiver 514 in the FSK timing signal. For instance, the FSK timing signal encoder 520 may periodically interrupt the timing information being encoded into the 200 Hz FSK timing signal, wait a predetermined period of time (to signal to base station 550 that TOD information will follow), and then modulate the TOD information onto the 92 kHz subcarrier (or output the TOD information to the 92 kHz subcarrier generator 518, which can then modulate the TOD information onto the 92 kHz subcarrier). In either scenario, after inserting the TOD information, the FSK timing signal encoder 520 typically resumes encoding timing information in the 200 Hz FSK timing signal.

Referring now to base station 550, it typically includes components for providing WiMAX service, such as those described in reference to base station 250 of FIG. 2 and those that are generally known to those skilled in the art. Base station 550 is also configured to decode the composite FM signal broadcast from FM transmitter 513, and use the 92 kHz subcarrier as high-stability reference signal with which to stabilize its local oscillator 552. As such, base station 550 includes an FM receiver 554 configured to receive the composite FM signal, and a sub-channel decoder 556 that is configured to extract the 92 kHz subcarrier from the received FM signal. The local oscillator 552 may then be phase-locked to the 92 kHz subcarrier once extracted.

Further, base station 550 may include an FSK decoder 558, which is configured to demodulate the 92 kHz subcarrier in order to acquire the 200 Hz FSK timing signal. More specifically, the FSK decoder 558 receives the 92 kHz subcarrier from the sub-channel decoder 556, and demodulates the 92 kHz subcarrier to extract the 200 Hz timing signal. The timing information provided by the 200 Hz timing signal may then be used by WiMAX signal generator 560 for frame-start synchronization. For instance, as described herein, the base station 550 may implement a time advance, which is equal to the time-of-flight delay between base station 550 and FM station 502, from each transition in the FSK timing signal. As such, when the base station 550 detects a transition, it may wait for a period of time to compensate for the time-of-flight delay, and then initiate the transmission of the next WiMAX frame.

In a further aspect, WiMAX base station 550 may be configured to extract TOD information from the 200 Hz FSK timing signal, as explained herein. Also as explained herein, WiMAX base station 550 may be pre-programmed or configured to determine its location and/or calculate time-of-flight delay to broadcast station 502, without relying on a GPS signal. A WiMAX base station that is configured as such, and is configured to use the subcarrier as a high-stability reference signal, may be fully operational without any use of GPS, as all functions for which a GPS signal would otherwise be used (e.g., local-oscillator stabilization, frame-start synchronization, obtaining TOD information, and/or location determination), are supported without use of a GPS. However, it should be understood that in some embodiments, WiMAX base station 550 may use the subcarrier as a high-stability reference signal, but still use GPS for other purposes (or possibly even purposes overlapping those for which the subcarrier is used).

Exemplary embodiments of the present invention have been described above. It should be understood the word "exemplary" is used herein to mean "serving as an example, instance, or illustration." Any embodiment described herein as "exemplary" is not necessarily to be construed as preferred or advantageous over other embodiments. In addition, those skilled in the art will understand that changes and modifications may be made to these exemplary embodiments without departing from the true scope and spirit of the invention, which is defined by the claims.

We claim:

1. A method comprising:
  at a terrestrial broadcast station, receiving a Global Positioning System (GPS) signal;
  the terrestrial broadcast station phase-locking a local oscillator to the GPS signal;
  the terrestrial broadcast station using the local oscillator to generate a subcarrier signal, thereby phase-locking the subcarrier signal to the GPS signal; and
  the terrestrial broadcast station transmitting a terrestrial broadcast signal that includes the phase-locked subcarrier signal, thereby providing the phase-locked subcarrier signal for use by a base station as a high-stability reference for local-oscillator stabilization at the base station.

2. The method of claim 1, wherein generating the subcarrier signal comprising timing information comprises:

generating a timing signal comprising the timing information, wherein the timing signal is phase-locked to the GPS signal; and modulating the timing signal onto a subcarrier of the terrestrial broadcast signal.

3. The method of claim 2, further comprising the terrestrial broadcast station periodically interrupting the timing information in the timing signal, waiting a predetermined period of time, and then inserting time-of-day information in the timing signal.

4. The method of claim 2, wherein the subcarrier signal is a 92 kHz subcarrier of an FM radio signal, and wherein the timing signal comprises a 200 Hz frequency shift keying (FSK) timing signal.

5. The method of claim 1, further comprising:

the broadcast station generating a timing signal comprising timing information, wherein the timing signal is phase-locked to the GPS signal; and before transmitting the subcarrier signal, the broadcast station modulating the timing signal onto the subcarrier, thereby providing the timing information for use by a base station for frame-start synchronization.

6. The method of claim 1, wherein terrestrial broadcast station comprises an FM radio station.

7. The method of claim 1, wherein terrestrial broadcast station comprises a television broadcast station.

8. The method of claim 1, wherein the phase-locked subcarrier signal provides timing information for use by the base station as a high-stability reference signal for local-oscillator stabilization at the base station configured for wireless communications under a Long Term Evolution (LTE) protocol.

9. A terrestrial broadcast system comprising:

a GPS receiver configured to acquire a Global Positioning System (GPS) signal;

a local oscillator that is phase-locked to the GPS signal;

a subcarrier generator that is configured to use the local oscillator to generate a subcarrier signal, thereby phase-locking the subcarrier signal to the GPS signal; and a transmitter configured to transmit a terrestrial broadcast signal that includes the phase-locked subcarrier signal, thereby providing the phase-locked subcarrier signal for use by a base station as a high-stability reference signal for local-oscillator stabilization at the base station.

10. The system of claim 9, further comprising a timing-signal generator, wherein the timing-signal generator is configured to periodically interrupt the timing information being modulated onto the subcarrier signal, wait for a predetermined period of time, and then modulate time-of-day information onto the subcarrier signal.

11. A method comprising:

at a base station, receiving a terrestrial broadcast signal, wherein the broadcast signal comprises a subcarrier signal that has been phase-locked to a Global Positioning System (GPS) signal by a terrestrial broadcast station, wherein the terrestrial broadcast station phase-locked a broadcast-station local oscillator to the GPS signal, and wherein the phase-locked subcarrier signal is generated in phase with the broadcast-station local oscillator;

decoding the terrestrial broadcast signal to acquire the subcarrier signal;

using the subcarrier signal to stabilize a local oscillator at the base station, wherein the local oscillator is used by the base station to maintain signal stability for wireless communications.

12. The method of claim 11, wherein the local oscillator is used by the base station to maintain signal stability for communications under a Long Term Evolution (LTE) protocol.

13. The method of claim 11, wherein the received signal comprises an FM radio signal.

14. The method of claim 13, wherein the subcarrier signal comprises a subcarrier having a timing signal modulated therein, wherein the subcarrier is a 92 kHz subcarrier, and wherein the timing signal comprises a 200 Hz frequency shift keying (FSK) timing signal.

15. The method of claim 11, wherein the subcarrier signal comprises timing information, the method further comprising:

detecting periodic interruptions in timing information; and after detecting each interruption in the timing information, acquiring time-of-day information from the subcarrier signal.

16. A base-station system comprising:

a receiver configured to receive a terrestrial broadcast signal, wherein the broadcast signal comprises a subcarrier signal that has been phase-locked to a Global Positioning System (GPS) signal by a terrestrial broadcast station, wherein the terrestrial broadcast station phase-locked a broadcast-station local oscillator to the GPS signal, and wherein the phase-locked subcarrier signal is generated in phase with the broadcast-station local oscillator;

a decoder configured to decode the terrestrial broadcast signal to acquire the phase-locked subcarrier signal; and a local oscillator that is operable to stabilize wireless signal transmissions by a base station, wherein the local oscillator is stabilized based on the phase-locked subcarrier signal.

17. The system of claim 16, wherein the terrestrial broadcast signal comprises an FM radio signal, and wherein the receiver comprises an FM receiver.

18. The method of claim 16, wherein the local oscillator is operable to stabilize wireless signal transmissions by the base station under a Long Term Evolution (LTE) protocol.

* * * * *